United States Patent
Fujioka

(10) Patent No.: US 8,234,235 B2
(45) Date of Patent: Jul. 31, 2012

(54) SECURITY AND REMOTE SUPPORT APPARATUS, SYSTEM AND METHOD

(75) Inventor: Robb Fujioka, Manhattan Beach, CA (US)

(73) Assignee: Fuhu Holdings, Inc., El Segundo, CA (US)

( * ) Notice: Subject to any disclaimer, the term of this patent is extended or adjusted under 35 U.S.C. 154(b) by 800 days.

(21) Appl. No.: 12/383,301

(22) Filed: Mar. 23, 2009

(65) Prior Publication Data

US 2010/0241607 A1    Sep. 23, 2010

Related U.S. Application Data

(60) Provisional application No. 61/070,769, filed on Mar. 25, 2008.

(51) Int. Cl.
*G06N 5/00*    (2006.01)

(52) U.S. Cl. ............................................. 706/52; 706/45

(58) Field of Classification Search .................... 706/52, 706/45

See application file for complete search history.

(56) References Cited

U.S. PATENT DOCUMENTS

| | | |
|---|---|---|
| 2004/0019894 A1 | 1/2004 | Willard et al. |
| 2005/0278575 A1 | 12/2005 | Nicholson et al. |
| 2006/0240990 A1 | 10/2006 | Reich et al. |

OTHER PUBLICATIONS

Coons, Virtual Thin Client: A Scalable Service Discovery Approach for Pervasive Computing, Master's Thesis, University of Florida, 2001, pp. 1-79.*
Engadget—Phoenix Technologies launches HyperSpace "instant on" embedded OS, Nov. 6, 2007; http://www.engadget/2007/11/06/phoenix-technologies-launches-hyperspace-instant . . . ; pp. 1-3.
Engadget—DeviceVM's SplashTop: more info about the five second Linux system, Oct. 9, 2007; http://www.engadget.com/2007/10/09/devicevms-splashtop-more-info-about-the-five-seco . . . ; pp. 1-3.
Engadget—ASUS P5E3 Deluxe mobo boots in five seconds with embedded Linux, Oct. 8, 2007; http://www.engadget.com/2007/10/08/asus-p5e3-deluxe-mobo-boots-in-five-seconds-with- . . . ; pp. 1-2.
InfoWorld—Phoenix Technologies tries again with instant-on apps, Nov. 5, 2007; http://www.infoworld.com/article/07/11/05/Phoenix-Technologies-tries-instant-on-apps_1 . . . ; pp. 1-2.

* cited by examiner

*Primary Examiner* — Wilbert L Starks
(74) *Attorney, Agent, or Firm* — Marc Hankin; Kevin Schraven; Hankin Patent Law, APC

(57) ABSTRACT

Systems and methods for the security and remote monitoring of computers are described. A computer monitoring system is provided which includes a computer hard drive, a thin client communicatively connecting a plurality of software associated with the computer hard drive with at least one remote virtual server, a central monitoring station communicatively connected to the thin client, and at least one BIOS monitor, at least partially resident locally to the computer hard drive, wherein the central monitoring station enforces at least one action upon execution of at least one alert from the at least one BIOS monitor.

30 Claims, 2 Drawing Sheets

SECURITY AND REMOTE SUPPORT APPARATUS, SYSTEM AND METHOD

CROSS REFERENCE TO RELATED APPLICATIONS

This Application claims priority to copending Application Ser. No. 61/070,769, entitled "SECURITY AND REMOTE SUPPORT APPARATUS, SYSTEM AND METHOD", filed Mar. 25, 2008, the entire disclosure of which is hereby incorporated by reference as being set forth in its entirety herein.

STATEMENT REGARDING FEDERALLY SPONSORED RESEARCH OR DEVELOPMENT

Not Applicable

BACKGROUND OF THE INVENTION a. Field of the Invention

The instant invention relates to the field of computers, and in particular to hardware support, security and remote monitoring of computers, and a system and method employing same.

b. Background of the Invention

As is well known, computers commonly crash, and often reach a state of hardware disrepair prior to such a crash, unbeknownst to a user of such a computer. The lifecycle of computers is becoming increasingly shorter, particularly in that modern computers with ultra-high speed processing, and the component parts thereof, do have an increasingly finite life span. Most computer problems, however, do not result from stress on the computing hardware, but rather stem from careless handling, neglect, unhealthy environments, careless manufacturing and old age. Such ailments make it easy to understand why the average computer system rarely survives more than ten years without some sort of catastrophic failure.

Ordinarily, this brief lifespan would not be of concern, since the average useful life of a computer system; the time in which it is still relevant and capable of running the software of the day, is far shorter than a typical computer lifespan, such as five years, for example. However, careless handling or neglect can cause a catastrophic failure even during the useful life of a computer. Likewise, viruses or the like may be obtained, without knowledge by the offending user, which may ultimately disable a computer. Chances are that anyone who has ever owned more than one computer has experienced some sort of unexpected computing catastrophe from a system that should still have had years of useful life left.

In particular, for example, hard drives of computer very often fail. Hard drives are known to fail as a result of vibration, heat, static charge, and power surges, for example. For instance, a hard drive's prime element is a drive head(s) that is configured to read the information contained on the drive. The drive heads float a very small distance, such as a micron, for example, above the surface of the drive platter that holds, or is embedded with, the data. This small separation dictates that subjecting the drive globally to vibrations can cause the drive head to offset, crashing the drive and rendering the drive inoperable.

Further, heat problems can cause delicate electronics, such as the aforementioned drive head, of hard drives to fail. Heat may be generated for a multitude of reasons, such as fans clogging or otherwise not operating properly or efficiently, stress on the motherboard causing the computer to run but at increased temperatures, or hard drives laboring and therefore producing more heat than normal to perform functions, for example. Additionally, static electricity and electrical disturbances, such as power surges, may severely limit the lifetime of a hard drive. While such conditions are possible to minimize they are nearly impossible to eliminate.

Therefore, a need exists monitor a computer at least during its typical useful lifetime, including its hard drive and other components, so that the component or computer may be replaced before failure due to hardware or a security breach occurs and before a catastrophic loss of data.

SUMMARY OF THE INVENTION

The present invention is directed to computer monitoring system, comprising a computer hard drive, a thin client communicatively connecting a plurality of software associated with the computer hard drive with at least one remote virtual server, a central monitoring station communicatively connected to the thin client, and at least one BIOS monitor, at least partially resident locally to the computer hard drive, wherein the central monitoring station enforces at least one action upon execution of at least one alert from said at least one BIOS monitor.

The present invention solves problems experienced with the prior art because it provides for improved monitoring of computer at least during its typical useful lifetime, including its hard drive and other components, so that the component or computer may be replaced before failure due to hardware or a security breach occurs and before a catastrophic loss of data. Those and other advantages and benefits of the present invention will become apparent from the detailed description of the invention hereinbelow.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical computer systems. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

Figure 1:
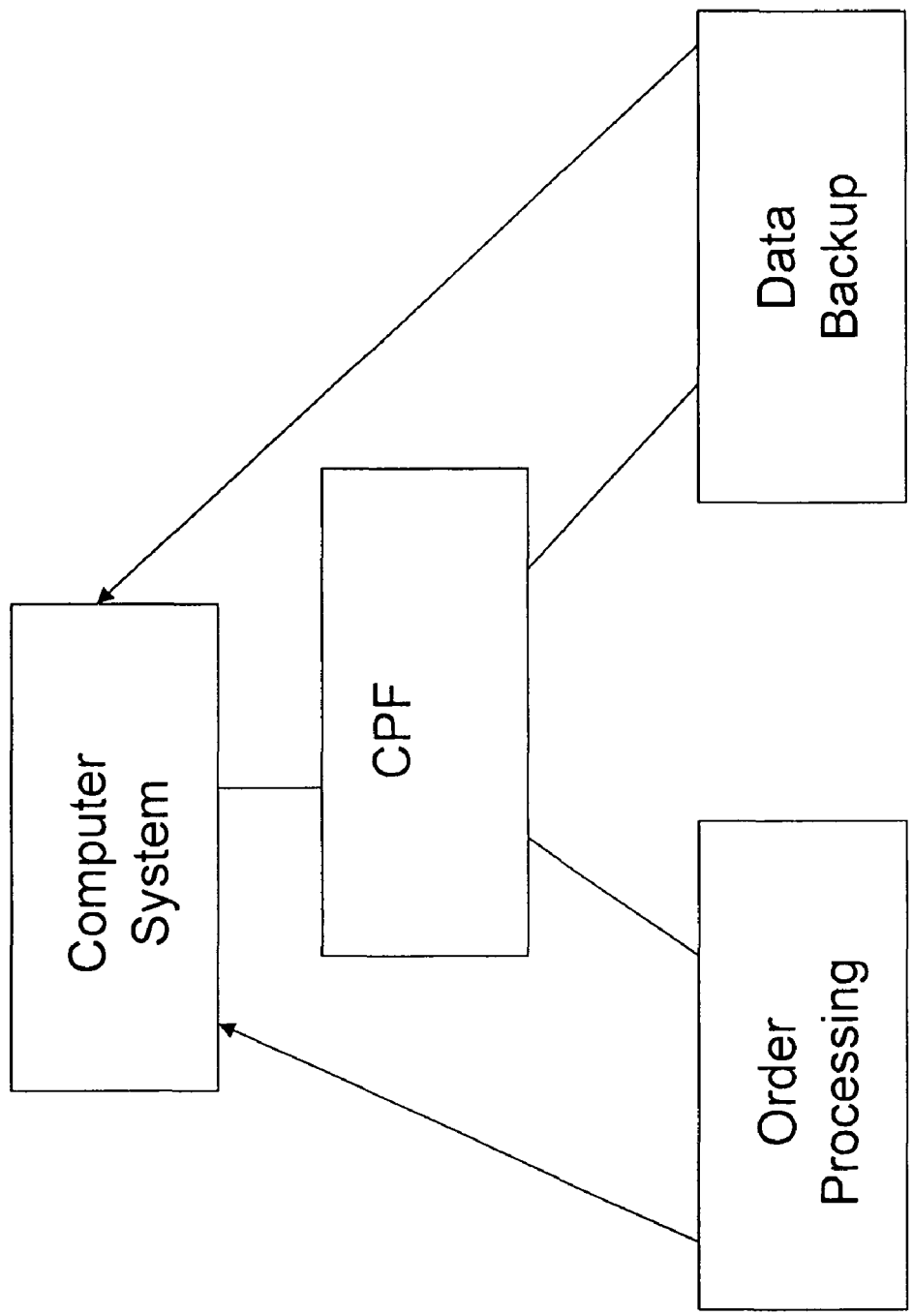
FIG. 1 is a illustrative representation of the security and remote support according to an aspect of the present invention.

Referring now to FIG. 1, there is shown a configuration for monitoring the aspects of a computer system such that, upon an alert on a given component, the contents of that component may be archived and a replacement component may be ordered/shipped for replacement installation. As may be seen in FIG. 1, a computer system, either locally to a user or via a thin client system, may be monitored. For example, the discussion hereinbelow may include a monitor resident on the user's computer, such as on the user's hard drive, or may be remote from the user, such as via a hyperdriver access to a computing BIOS, wherein a remote server virtually provides computing software to the computer, while additionally monitoring the health of the computer via the interface to the BIOS.

Each of the myriad of components of computer system may be monitored as described hereinbelow. Information, in the form of alerts or the underlying monitored data, may, for example, be sent to a central processing facility. Central processing facility may interpret the sent information and perform actions based on the information, such as automatically ordering parts or computers for users, downloading data to a backup, and the like. Thereby, central processing may perform data backup, may order replacement parts, and/or may alert the user or owner of computer system of potential issues, for example.

Hard drives can suffer one of two classes of failures: predictable ones, wherein failure modes, especially mechanical wear and aging, happen gradually over time; or unpredictable ones, wherein other failures may occur suddenly and unpredictably, such as an electronic component failing. A monitoring device can detect predictable classes of failures, much as a temperature dial on the dashboard of an automobile can warn a driver—before serious damage occurs—that the engine has started to overheat. Mechanical failures, which may be classified as predictable failures, account for more than half of drive failures, as would be generally understood to those possessing an ordinary skill in the pertinent arts.

Several attempts have been made to monitor specific portions of computer systems. In particular, self-monitoring analysis and reporting technology has been used to warn a user or system administrator of purportedly impending drive failure while time remains to take preventative action. The level of prediction by this methodology is relatively low, with an estimated success rate in the prediction of approximately one in three. This is due, in part, to the fact that some types of failures are better predicted within such systems than others. For example, drives indicating their first scan error are many times, such as 50 times, for example, more likely to fail within 60 days than drives with no such errors. First errors in reallocations, offline reallocations, and probational counts may also be strongly correlated to higher failure probabilities.

Technology has been extended to not only monitor drives, but adds failure prevention by attempting to detect and repair sector errors, and to further test all data and all sectors of a drive by using off-line data collection to confirm the drive's health during periods of inactivity.

Another type of failure monitoring includes Predictive Failure Analysis technology. This technology measures several key device health parameters and evaluates the parameters within the drive firmware. Reporting within this technology is generally limited to an "OK" or a "likely to fail soon."

Presently, disk drives may measure the disk health parameters, and these values may be transferred to the operating system and user-space monitoring software. Each disk drive vendor is free to decide which parameters are to be included for monitoring and what are their respective thresholds.

A "threshold exceeded" value is intended to indicate that there is a relatively high probability that the drive will not be able to honor its specification in the future: that is, it's "about to fail". However, the predicted failure may be catastrophic or may be something as subtle as inability to write to certain sectors or slower performance than the manufacturer's minimum. This is, in part, because the inability to read some sectors is not always an indication that the drive is about to fail; for example, one way that unreadable sectors may be created even when the drive is functioning within specification is if the power fails while the drive is writing. Alternatively, even if the physical disk is damaged in one location so that a sector is unreadable, the disk may be able to use spare space to replace the bad area so that the sector can be overwritten.

More detail on the health of the drive may be obtained by examining the certain attributes. The meaning and interpretation of the attributes varies between manufacturers and is sometimes considered a trade secret by the manufacturer.

Even on hard drives and interfaces that support hard drives, data may not be reported correctly to the computer's operating system. Some disk controllers may duplicate all write operations on a secondary "backup" drive in real-time. This feature is known as "RAID mirroring". However, many programs which are designed to analyze changes in drive behavior and relay alerts to the operator do not function when a computer system is configured for RAID support, usually because under normal RAID array operational conditions, the computer may not be permitted to see or access individual physical drives, but only logical volumes, by the RAID array subsystem.

Drives often optionally support a number of logs. The error log records information about the most recent errors that the drive has reported back to the host computer. Examining this log may help to determine whether computer problems are disk-related or caused by something else. Further, a drive may optionally support a number of self-test or maintenance routines, and the results of the tests are kept in the self-test log. The self-test routines may be efficiently used to detect any unreadable sectors on the disk so that they may be restored from backup (for example, from other disks in a RAID). This helps to reduce the risk of a situation where one sector on a disk becomes unreadable, then the backup is damaged, and the data is lost forever.

In addition to drive failures, computers frequently experience motherboard failures. Many motherboards may display a warning message when a disk drive approaches failure, although there are remaining issues at least in that there is proprietary "secret knowledge" held by individual manufacturers as to their specific approach. As a result, known standards may not always be implemented correctly on many computer platforms due to the absence of industry-wide software and hardware standards for data interchange.

When using certain operating systems, many programs designed to monitor and report information may only function under an administrator account, or may be corrupted by security breach. An issue also presents in that prevention techniques are implemented individually by manufacturers, and while some aspects are standardized for compatibility, others are not. For example, each drive manufacturer defines a set of attributes and selects threshold values which attributes should not pass under normal operation. Each attribute has a raw value whose meaning is entirely up to the drive manufacturer, such as, for example, a normalized value that ranges from 1 to 253 (1 representing the worst case and 253 representing the best). For example, depending on the manufacturer, a value of 100 or 200 will often be chosen as the "normal" value.

Similarly, the power supply of a desktop and/or the battery of a laptop or the like may be monitored. It is generally well understood that many of the problems that terminate a computer's existence are the result of power fluctuations. There are several well known causes of battery/power supply failures which are high or uneven battery temperatures, inaccurate float charge voltage (the overcharge or undercharge problem), loose intercell links or connections, loss of electrolyte due to cracked or bowed cases, lack of maintenance, and plate corrosion. Therefore collecting, monitoring and reporting information on the battery/power supply resistance, the overall voltage, cell voltages, ambient temperatures, cell temperatures, float current, discharge current, string currents and discharge times may help to prolong computing life.

In addition many of the other known BIOS functionalities may be monitored to provide information on the status of various computer systems. Using the BIOS information also provides information regarding the configuration of the computer itself, such that BIOS-identified devices are known to exist and may be monitored and have the status thereof reported. Further, monitoring may include monitoring the fan speed, monitoring the temperature of the mother board, monitoring software health, such as the presence of viruses, worms, or the like, by way of non-limiting example only. In particular, by way of non-limiting example only, the various system temperatures, CPU temperature, CPU fan speed, Power supply fan speed, CPU core voltage, I/O voltage, various operating voltages, standby voltage and the like may be monitored. Further, various hardware may be monitored, such as, by way of non-limiting example only, video cards, network cards, sound cards, USB controller, RAM. The network's health may also be monitored. This may be an important function as the network may provide an avenue to alert users and/or the central processing facility that an error may be imminent.

In the event that the computer being monitored is operating a windows based environment, the windows management instrumentation may also be queried and the results reported and monitored. In such a configuration select scripts may be used to query the operating system for information about the hardware and/or the software.

Figure 2:
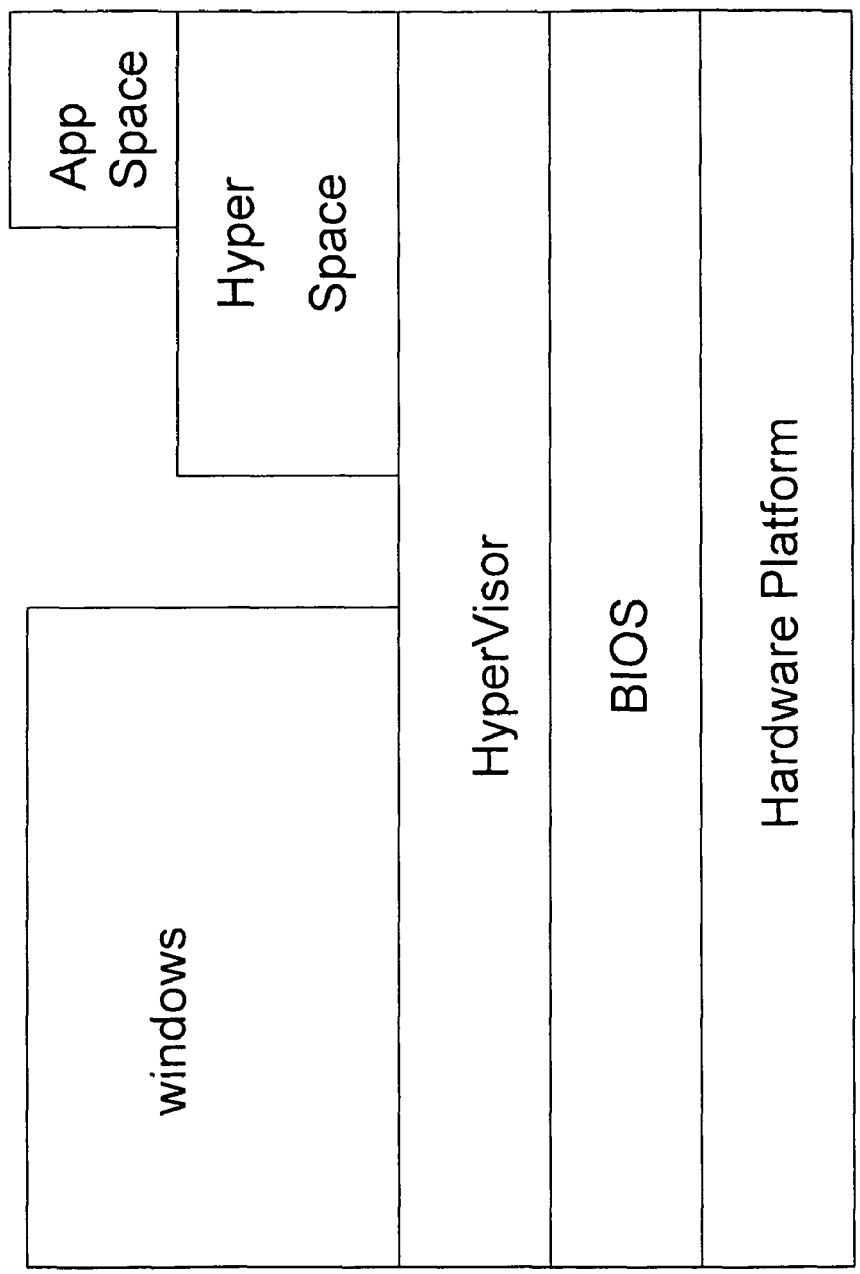
FIG. 2 is a illustrative representation of the security and remote support according to an aspect of the present invention.

Once the global monitoring of the BIOS, and, in certain embodiments, additionally the operating system, software, and external devices, detects an "out of specification" result, according to an aspect of the present invention, the system may notify the central processing facility of the detected result. In such a situation, the facility may be linked via the network, via a virtual network, such as a thin client, or the like, for example. Such a thin client and/or virtual network may include, as illustrated in FIG. 2, a monitoring application in the application space of a hypervisor, operating on and communicating with a virtual network regarding the health of the hardware and software of the local computer, and interconnected to the BIOS.

It is also an aspect of the present invention that the monitoring portions of the invention perform monitoring and report the monitored information solely to the central processing facility, and such central processing facility determines if a given specification or set of specifications is out of specification. Thereby, manufacturer specific exclusive data set-types will not be disclosed locally to the computer user, but need be known only at the central processing facility. Thus, the monitoring may be a black box to the user, but, needless to say, the resultant data may be fed back to one or more applications at the local computer to allow for status to be displayed by an application at the local machine, if desired.

Therefore, the data itself is known only to the central processing facility, although the judgments made from the data may be made locally known.

Once notified, the central monitoring station may perform a number of actions. These actions may include copying information from the local disk drive to a remote backup disk drive, forcing the local machine to copy to a local backup drive, ordering a replacement part, or alerting the user/owner of the local computer that an error is expected to occur. Decisions on the action taken may be determined based on the notification result that has been detected, as well as the likelihood of an error and what error is suspected of eventually occurring.

According to an aspect of the present invention, upon receipt of an alert a corrective action may be taken. For example, in the situation where an alert is sent that the hard drive of a computer has a likely failure rate of over 50% within the next 10 days, a backup of the potentially expiring hard drive may be performed locally and/or remotely (remotely may be performed for a fee, for example), while a new hard drive is sent to the user for installation. Or, such as in the case of a thin client, a mirror may be stored by the virtual server in anticipation of the replacement of the hard drive. Upon replacement installation, the potentially expiring hard drive information may be directed to be copied to the new drive from the backup location.

Additionally, successive backups may be run while maintaining the previous backup. For example, in a situation where there is a likely 10 day period for failure, a backup may be performed on a repetitive timeframe such as daily, twice daily, or the like, and the previous backups maintained. Such a backup hierarchy may allow a greater amount of data to be recovered, particularly in a case wherein an imminent failure may negatively affect the information being backed up, as would be understood by those possessing an ordinary skill in the art.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed:

1. A computer monitoring system, comprising:
a computer hard drive;
a thin client communicatively connecting a plurality of software associated with said computer hard drive with at least one remote virtual server;
a central monitoring station communicatively connected to said thin client; and
at least one BIOS monitor, at least partially resident locally to said computer hard drive, wherein said central monitoring station enforces at least one action upon execution of at least one alert from said at least one BIOS monitor.

2. The system of claim 1, further comprising a predictive engine communicatively coupled with the at least one BIOS monitor, wherein the predicative engine provides a basis for said at least one alert by evaluating one or more system components.

3. The system of claim 2, wherein the one or more system components are selected from the group consisting of a mother board, memory, power supply, software, BIOS, hypervisor, and peripherals.

4. The system of claim 1, wherein the at least one BIOS monitor tracks one or more system wide attributes.

5. The system of claim 1, wherein the at least one BIOS monitor provides at least one system status report to the central monitoring station.

6. The system of claim 1, wherein the central monitoring station contains at least one system specification not resident on the at least one BIOS monitor.

7. The system of claim 1, wherein the at least one action is selected from the group consisting of backing up the local drive to a local location, backing up the local drive to a remote location, and alerting the system user to the at least one alert.

8. The system of claim 1, wherein the at least one action includes requesting at least one replacement component from at least one remote location.

9. The system of claim 1, wherein the BIOS monitor is partially resident on said thin client.

10. The system of claim 1, wherein the BIOS monitor is partially resident on said central monitoring station.

11. The system of claim 1, wherein the BIOS monitor is partially resident via said at least one virtual server.

12. The system of claim 1, wherein said thin client communicates using hyperdriver access.

13. A method for providing a computer monitoring system, comprising the steps of:
communicatively connecting a plurality of software associated with a computer hard drive and a thin client associated with at least one remote virtual server; and
communicatively connecting to said thin client a central monitoring station;
wherein at least one BIOS monitor, at least partially resident locally to said computer hard drive, provides to said central monitoring station at least one alert upon which the execution of at least one action is performed.

14. The method of claim 13, wherein the at least one action includes requesting at least one replacement component from at least one remote location.

15. The method of claim 13, wherein the BIOS monitor is partially resident on said thin client.

16. The method of claim 13, wherein the BIOS monitor is partially resident on said at least one computer hard drive.

17. The method of claim 13, wherein the one or more system components includes said computer hard drive.

18. The method of claim 13, wherein the BIOS monitor is partially resident on said at least one virtual server.

19. The method of claim 13, wherein said thin client communicates using hyperdriver access.

20. The method of claim 13, wherein said thin client communicates using hyperdriver access.

21. A computer monitoring system, comprising:
at least one microprocessor;
a least one computer hard drive;
a thin client at least partially resident in said at least one microprocessor communicatively connected with at least one remote server;
a central monitoring station communicatively connected to said thin client;
at least one BIOS monitor, at least partially resident locally to said at least one microprocessor, wherein said central monitoring station enforces at least one action upon execution of at least one alert from said at least one BIOS monitor; and
a predictive engine communicatively coupled with the at least one BIOS monitor, wherein the predicative engine indicates said at least one alert by evaluating one or more system components.

22. The system of claim 21, wherein the one or more system components are selected from the group consisting of a mother board, memory, power supply, software, BIOS, hypervisor, and peripherals.

23. The system of claim 21, wherein the at least one action is selected from the group consisting of backing up a local drive to a local location, backing up a local drive to a remote location, repairing sector errors, and alerting a user to the at least one alert.

24. The system of claim 21, wherein said predictive engine further evaluates at least one system log.

25. The system of claim 21, wherein the at least one action includes requesting at least one replacement component from at least one remote location.

26. The system of claim 21, wherein the BIOS monitor is partially resident on said thin client.

27. The system of claim 21, wherein the BIOS monitor is partially resident on said central monitoring station.

28. The system of claim 21, wherein the one or more system components includes said at least one computer hard drive, and wherein said BIOS monitor periodically samples the threshold value of said at least one computer hard drive.

29. The system of claim 21, wherein the BIOS monitor is partially resident via said at least one virtual server.

30. The system of claim 21, wherein said predictive engine periodically collects power supply data selected from the group consisting of power supply resistance, voltage, ambient temperature, battery temperature, float current, discharge current, string current and battery discharge time.

* * * * *